United States Patent
Carlson et al.

(10) Patent No.: US 10,977,176 B2
(45) Date of Patent: Apr. 13, 2021

(54) PREFETCHING DATA TO REDUCE CACHE MISSES

(71) Applicant: Cavium LLC, Santa Clara, CA (US)

(72) Inventors: David Carlson, Haslet, TX (US); Shubhendu S. Mukherjee, Southborough, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 68 days.

(21) Appl. No.: 16/199,852

(22) Filed: Nov. 26, 2018

(65) Prior Publication Data

US 2020/0167285 A1   May 28, 2020

(51) Int. Cl.
*G06F 12/00* (2006.01)
*G06F 12/0862* (2016.01)
*G06F 12/1018* (2016.01)
*G06F 12/0882* (2016.01)

(52) U.S. Cl.
CPC ...... *G06F 12/0862* (2013.01); *G06F 12/1018* (2013.01); *G06F 12/0882* (2013.01); *G06F 2212/1021* (2013.01); *G06F 2212/602* (2013.01); *G06F 2212/6024* (2013.01); *G06F 2212/6026* (2013.01); *G06F 2212/655* (2013.01)

(58) Field of Classification Search
CPC ............. G06F 12/0862; G06F 12/1018; G06F 12/0882; G06F 2212/6026; G06F 2212/602; G06F 2212/0882; G06F 2212/6024; G06F 2212/655; G06F 2212/1021
See application file for complete search history.

(56) References Cited

U.S. PATENT DOCUMENTS

| 2008/0016330 A1* | 1/2008 | El-Essawy ............ G06F 9/3455 712/225 |
| 2015/0199276 A1* | 7/2015 | Radhakrishnan ... G06F 12/0862 711/137 |

* cited by examiner

*Primary Examiner* — Kalpit Parikh

(57) ABSTRACT

A first memory request including a first virtual address is received. An entry in memory is accessed. The entry is selected using information associated with the first memory request, and includes at least a portion of a second virtual address (first data) and at least a portion of a third virtual address (second data). The difference between the first data and the second data is compared with differences between a corresponding portion of the first virtual address and the first data and the second data respectively. When a result of the comparison is true, then a fourth virtual address is determined by adding the difference between the first data and the second data to the first virtual address, and then data at the fourth virtual address is prefetched into the cache.

20 Claims, 6 Drawing Sheets

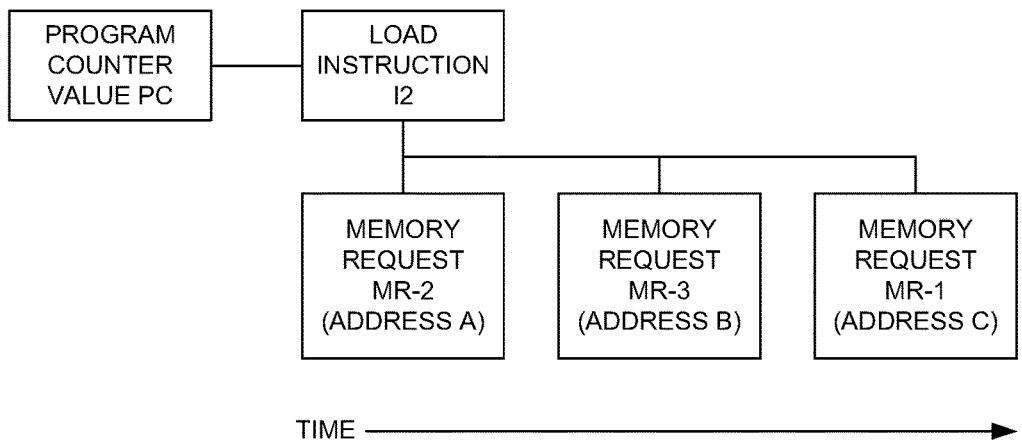
FIG. 4
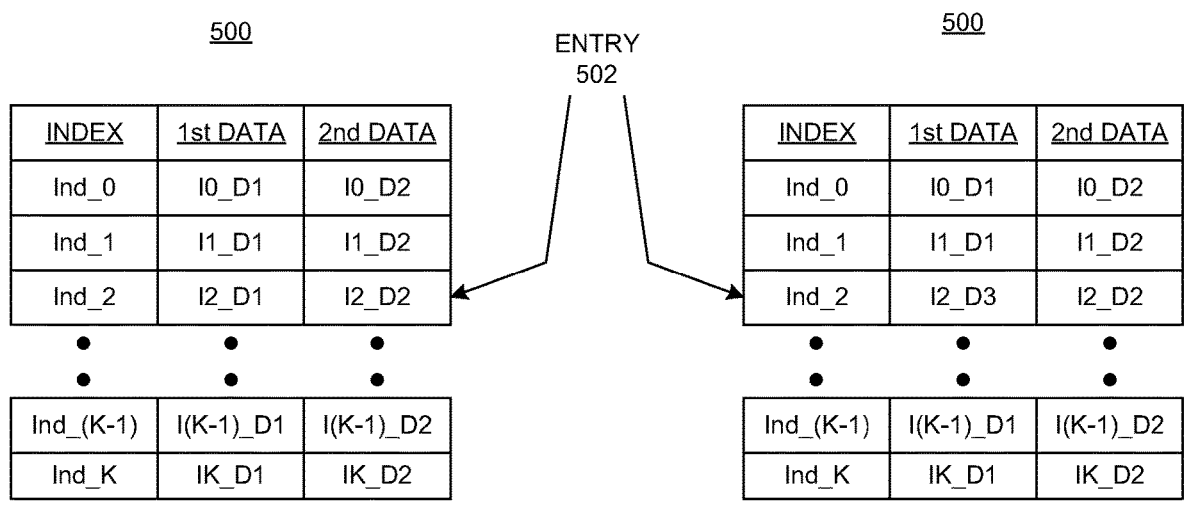
FIG. 5A
FIG. 5B

PREFETCHING DATA TO REDUCE CACHE MISSES

BACKGROUND

A primary factor in the utility of a computer system is the speed at which the computer system can execute an application. It is important to have data available when it is needed, to prevent the computer system from idling or stalling while it waits for data to be accessed from memory.

A widely used solution to reduce memory access latency and prevent stalling in a processor is to implement a hierarchy of caches in the computer system. In essence, one or more caches are situated between the main memory and the processor. The cache closest to the processor is usually referred to as the level one (L1) or lowest level cache, the next cache is usually referred to as the level two (L2) or higher level cache, and so on, with the cache that is closest to the main memory referred to as the highest level cache. The caches store recently used data based on the assumption that information might be needed again. By storing data in a hierarchical manner, the caches can reduce latency and prevent stalling by providing the data more rapidly than if the data had to be retrieved from, for example, the main memory.

Latency can be further reduced by prefetching information into the caches from slower memory. In essence, prefetching involves making a prediction of the data that may be needed by an application, and then fetching that data from, for example, the main memory into any one of the caches, or from one cache into another cache that is closer to the processor (e.g., from the L2 cache to the L1 cache). The predicting, fetching, and storing described above are performed opportunistically, e.g., before the data is actually requested by the application.

Conventional prefetching attempts to find a pattern in a stream of requests for data from memory based on the physical addresses associated with those requests. If a pattern can be found, then that pattern can be used to anticipate subsequent requests for information, so that information can be prefetched. For example, if the prefetcher determines that data has been requested from physical addresses 2, 4, and 6 in the L2 cache because of cache misses in the L1 cache (e.g., a pattern of every other physical address, corresponding to every other cache line), then the prefetcher can anticipate that the cache line at physical address 8 might also be needed and can prefetch that cache line. The difference between addresses in the pattern may be referred to as the stride.

A problem with conventional prefetching occurs because contemporary applications generally utilize virtual addresses instead of physical addresses. The virtual addresses are mapped to physical addresses, which conventionally can then be used to identify a pattern as described above. The size of a contemporary physical memory page is four (4) kilobytes (KB). In such an implementation, the virtual-to-physical mapping changes every 4 KB of physical address space. Thus, a first virtual address in a stream of memory requests may map to a first physical memory page, and a second virtual address in the stream may map to a second physical memory page. This is problematic because it is difficult to prefetch past the first page. This, in turn, can limit the length of the stride.

SUMMARY

Embodiments according to the present invention provide methods of prefetching data, and systems that implement such methods, that overcome the problems described above.

In general, a load instruction in an executing application can generate multiple memory requests to different addresses (virtual addresses) in memory. Those memory requests can be monitored, and a pattern of data fetches may be detected based on the differences between the virtual addresses in the requests.

In embodiments according to the present invention, a first memory request associated with a load instruction is generated or received (here, terms such as "first," "second," and "third" used only as modifiers to distinguish between elements that have the same name). The first memory request includes a first address (a first virtual address). When the first memory request results in a cache miss, a first entry in memory is accessed. The first entry is selected using (based on) information associated with the first memory request. In other words, a first memory request including a first virtual address is received. An entry in memory is accessed. The entry is selected using information associated with the first memory request, and includes at least a portion of a second virtual address ("first data") and at least a portion of a third virtual address ("second data"). The difference between the first data and the second data is compared with differences between a corresponding portion of the first virtual address and the first data and the second data respectively. When a result of the comparison is true, then a fourth virtual address is determined by adding the difference between the first data and the second data to the first virtual address, and then data at the fourth virtual address is prefetched into the cache.

In an embodiment, the information used to select the first entry is the program counter value for the load instruction associated with the first memory request. In an embodiment, an index for the first entry is determined by hashing selected bits of that program counter value. In embodiments, the first entry is one of a number of entries stored in a table, each entry having its own unique index based on a hash of the program counter value for the load instruction associated with the entry.

In embodiments, each entry in the table includes two addresses (virtual addresses), or at least a portion of those two addresses, of the last two memory requests for a load instruction that resulted in a cache miss. Thus, for example, the first entry includes at least a portion of a second virtual address and at least a portion of a third virtual address. The second virtual address, or portion thereof, may be referred to as first data, and the third virtual address, or portion thereof, may be referred to as second data. The second and third virtual addresses were included in other memory requests associated with the same load instruction as the first memory request and that most recently preceded the first memory request.

The difference between the first data and the second data is compared with the difference between the first data and a corresponding portion of the first virtual address. The difference between the first data and the second data is also compared with the difference between the second data and the corresponding portion of the first virtual address. A pattern in the virtual addresses of the memory requests is indicated when a result of either of these comparisons is true. The pattern's stride is the difference between the first data and the second data. In embodiments, a fourth address (another virtual address) is determined by adding the stride to the first virtual address. Data at the fourth virtual address can then be prefetched into the cache where the cache miss occurred.

In an embodiment, the first entry is updated to include at least a portion of the first virtual address. The first virtual address, or portion thereof, may be referred to as newer data.

In an embodiment, the newer data replaces the oldest data in the first entry. If, for example, the first data was included in the first entry before the second data was included in that entry, then the first data is replaced with the newer data. Accordingly, the first entry includes the virtual addresses, or portions of the virtual addresses, for the most recent memory requests associated with the load instruction associated with that entry.

In a similar manner, the other entries in the table include virtual addresses, or portions thereof, for the most recent memory requests associated with other load instructions. As described above, those virtual addresses can be used to determine whether there is a pattern in the virtual addresses of the memory requests and, if so, that pattern can then be used to prefetch data.

By identifying patterns of virtual addresses in memory requests using entries in a table as described above, and then using that information to prefetch data into a cache, embodiments according to the present invention reduce cache misses. As a result, significant improvements in computer benchmarks used in the industry (e.g., "specint" and "specfp") have been measured. Embodiments according to the present invention can be used to detect patterns in virtual addresses with large offsets and to prefetch data for strides of any practicable length, including offsets and strides much longer than 4096 bytes (e.g., on the order of megabytes). Thus, embodiments according to the present invention can be used to predict virtual addresses across different memory pages and to prefetch data across different memory pages.

These and other objects and advantages of the various embodiments according to the present invention will be recognized by those of ordinary skill in the art after reading the following detailed description of the embodiments that are illustrated in the various drawing figures.

This summary contains, by necessity, simplifications, generalizations, and omissions of detail; consequently, those skilled in the art will appreciate that this summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF DRAWINGS

The accompanying drawings, which are incorporated in and form a part of this specification and in which like numerals depict like elements, illustrate embodiments according to the present invention and, together with the detailed description, serve to explain the principles of the invention.

FIG. 4 illustrates memory requests for a load instruction in embodiments according to the present invention.

FIGS. 5A and 5B illustrate examples of a table that can be used in methods for prefetching data in embodiments according to the present invention.

DETAILED DESCRIPTION

Figure 1:
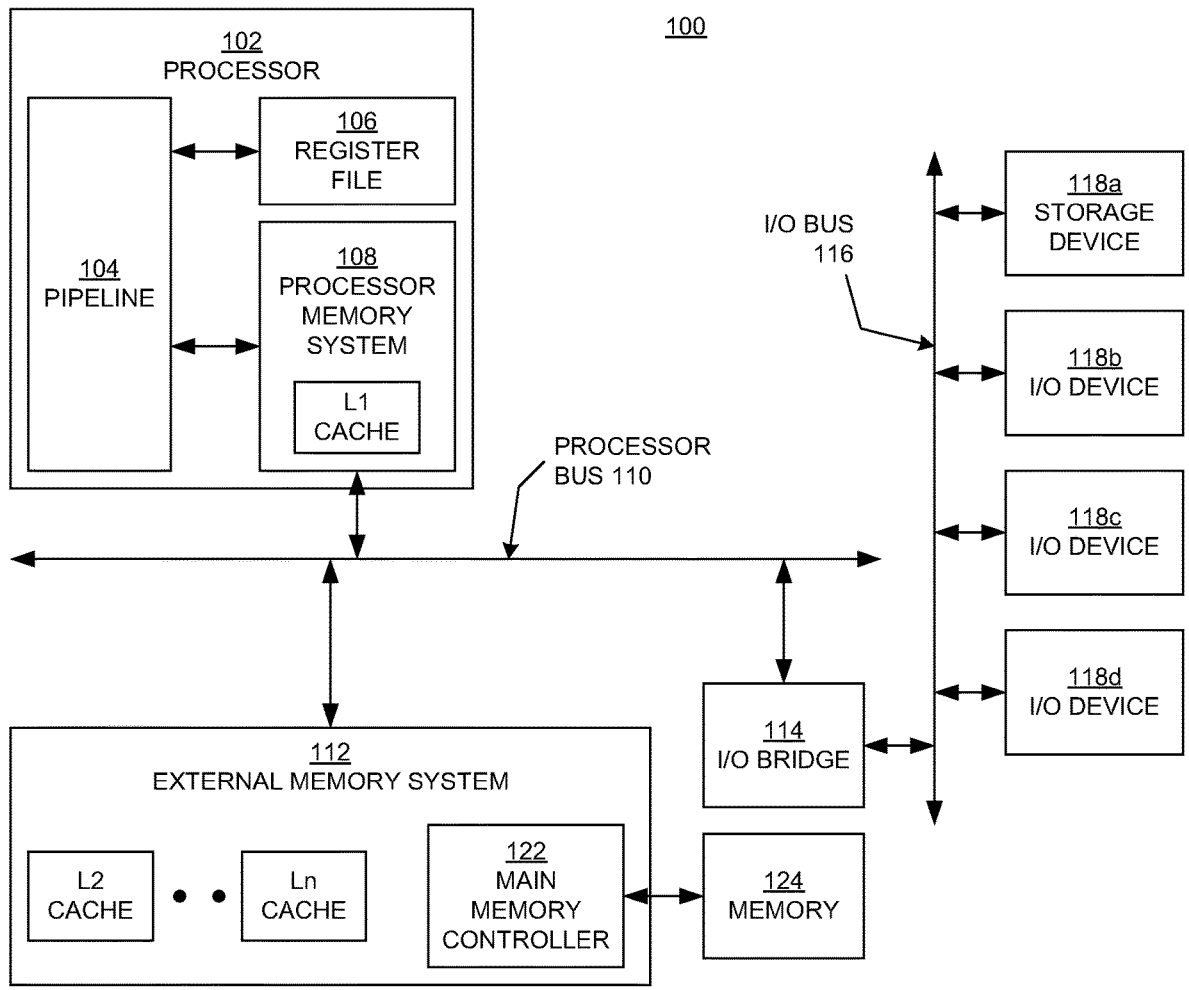
FIG. 1 is a block diagram illustrating an example of a computing system platform upon which embodiments according to the present invention can be implemented.

Reference will now be made in detail to the various embodiments according to the present invention, examples of which are illustrated in the accompanying drawings. While described in conjunction with these embodiments, it will be understood that they are not intended to limit the invention to these embodiments. On the contrary, the disclosure is intended to cover alternatives, modifications and equivalents, which may be included within the spirit and scope of the disclosure as defined by the appended claims.

Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "sending," "generating," "determining," "accessing," "selecting," "reading," "comparing," "hashing," "performing," "processing," "loading," "storing," "including," "replacing," "removing," "fetching," "prefetching," "indexing," or the like, refer to actions and processes (e.g., the flowcharts 600 and 700 of FIGS. 6 and 7, respectively) of a computing system or similar electronic computing device or processor (e.g., the computing systems 100 and 200 of FIGS. 1 and 2, respectively). A computing system or similar electronic computing device manipulates and transforms data represented as physical (electronic) quantities within the computing system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), dynamic RAM, (DRAM), caches, read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

As used herein, a memory request is an instruction that accesses memory. More specifically, a memory request refers to an instruction, message, or command for information (e.g., a block of data) from a memory (e.g., a cache or main memory). A block of data, or data block, may also be referred to herein as an instance of data or simply as data. A memory request may be a read/load operation to request a copy of a data block. A memory request may be a cache write-back operation or a cache replacement operation. These are examples only, and embodiments according to the present invention are not so limited. In a virtual memory scheme, memory requests associated with the program instructions (e.g., load instructions) being executed by a central processing unit (CPU) refer to virtual addresses within a virtual address space.

FIG. 1 is a block diagram illustrating an example of a computing system 100 upon which embodiments according to the present invention can be implemented. The system 100 includes at least one processor 102, which can be a single CPU or one of multiple processor cores of a multi-core architecture (e.g., see the example of FIGS. 2 and 3). In the FIG. 1 example, the processor 102 includes a pipeline 104, one or more register files 106, and a processor memory system 108. The processor memory system 108 includes circuitry that implements a memory request manager for managing memory requests, also referred to as a prefetcher.

The processor 102 is connected to a processor bus 110, which enables communication with an external memory system 112 and an input/output (I/O) bridge 114. The I/O bridge 114 enables communication over an I/O bus 116 with various different I/O devices including, for example, a storage device 118a and other I/O devices 118b, 118c, and 118d (e.g., a network interface, display adapter, and/or user input devices such as a keyboard or mouse). The storage device 118a, such as a disk drive or other large capacity (typically nonvolatile) storage device, can also serve as secondary storage for the main memory 124 in a virtual memory scheme.

In the example computing system 100, the processor memory system 108 and external memory system 112 together form a hierarchical cache system, including at least a first level (L1) cache within the processor memory system, and any number of higher level caches (L2, . . . , Ln) within the external memory system. The highest level cache within the external memory system 112 (which may be the L2 cache if there are only two levels in the hierarchy) is the Ln cache, which is located closer to the memory module (main memory) 124 than the other caches. The prefetcher can be configured to prefetch cache lines from any level of the memory hierarchy or from the main memory 124 to a lower level in the memory hierarchy including, in some embodiments, to the L1 cache within the processor 102.

The distribution of caches within the processor memory system 108 and the external memory system 112 may be different in other implementations. For example, the L1 cache and the L2 cache can both be internal to the processor 102, and the L3 cache (and higher level caches) can be external to the processor 102. If the processor 102 is a multi-core processor, each core can have its own internal L1 cache, and the cores can share an L2 cache (see the examples of FIGS. 2 and 3).

In the FIG. 1 example, the external memory system 112 also includes a main memory controller 122, which is connected to any number of memory modules (e.g., dynamic random access memory, DRAM, modules) that serve as the main memory 124.

Figure 2:
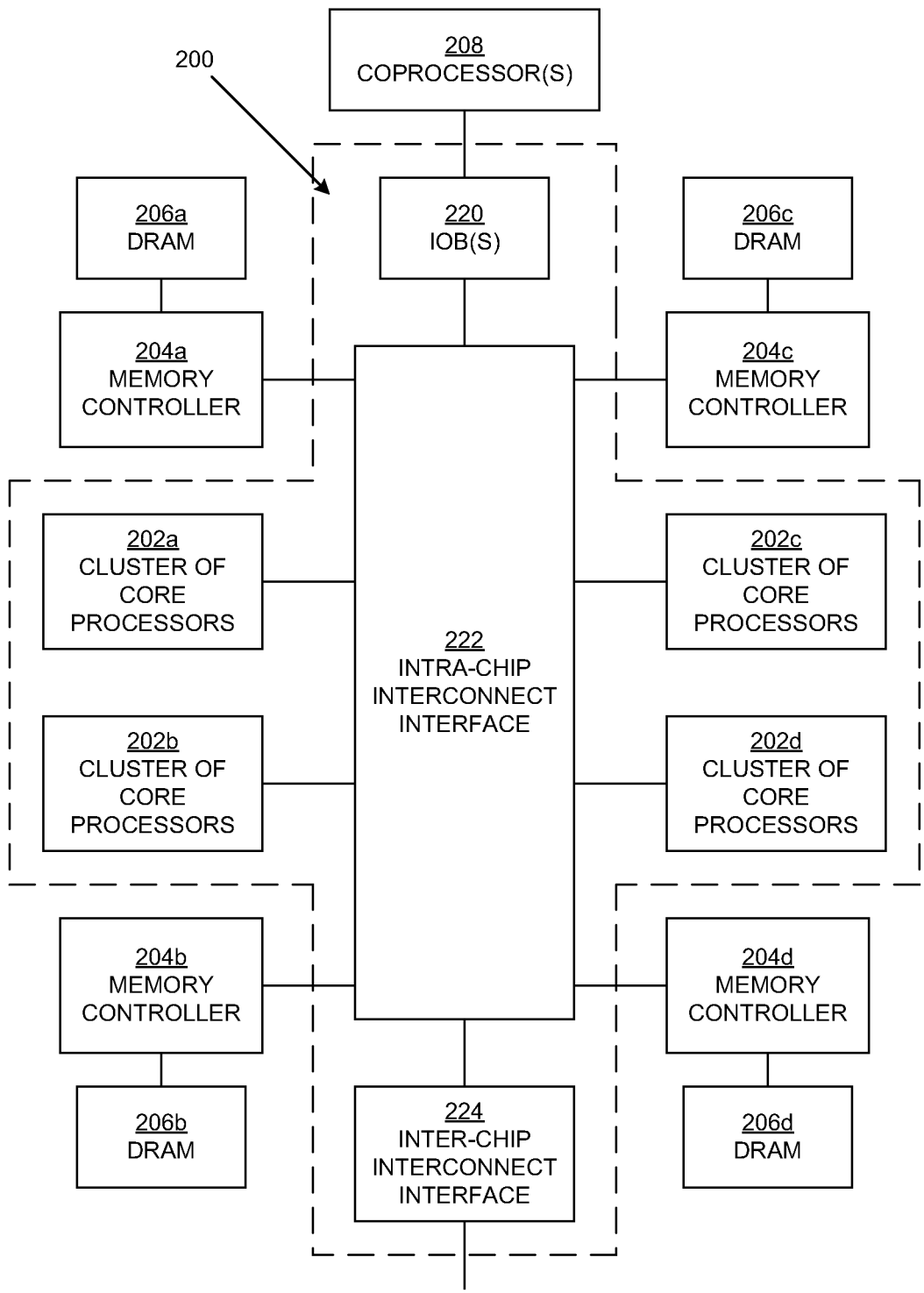
FIG. 2 is a block diagram illustrating another example of a computing system platform upon which embodiments according to the present invention can be implemented.

FIG. 2 is a block diagram illustrating another example of an architecture of a computing system 200 (e.g., a chip) upon which embodiments according to the present invention can be implemented. In the example architecture of FIG. 2, the system 200 includes a number of core processors or CPUs. In an embodiment, the core processors are arranged in multiple clusters 202a, 202b, 202c, and 202d (202a-d), which may be referred to herein individually as the cluster 202 or collectively as the clusters 202. While four clusters are shown, embodiments according to the present invention are not so limited.

Figure 3:
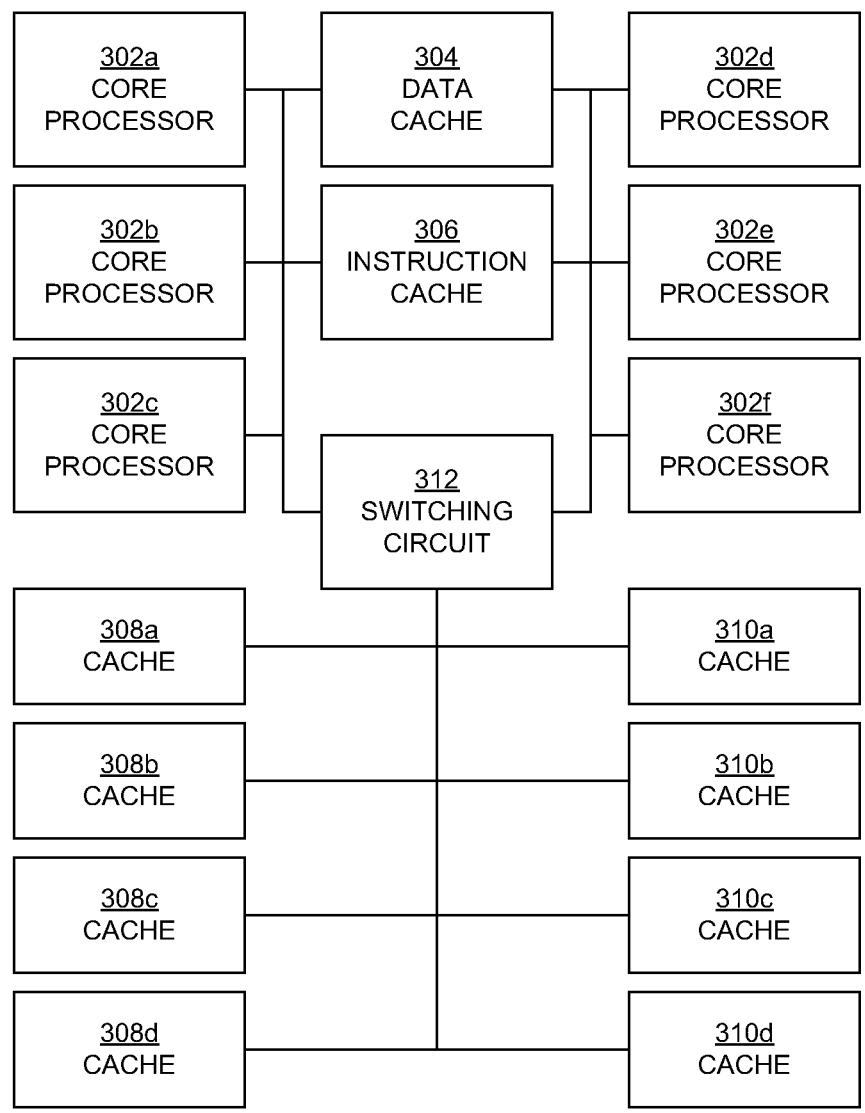
FIG. 3 is a block diagram illustrating an example of a cluster of core processors in embodiments according to the present invention.

FIG. 3 is a block diagram illustrating an example of a cluster 202 of core processors in embodiments according to the present invention. The cluster 202 may include components other than those shown or described herein.

In the FIG. 3 embodiments, the cluster 202 includes six core processors 302a, 302b, 302c, 302d, 302e, and 302f (202a-f), which may be referred to herein individually as the core processor 302 or collectively as the core processors 302. The core processors 302 may also be known as application processors. Many applications that are performed at network nodes are executable in parallel, and this characteristic makes multi-core chips particularly useful in network devices such as routers, switches, servers, and the like. While six core processors are shown, the present invention is not so limited.

In the FIG. 3 embodiments, a cluster 202 also includes at least one data cache 304 and at least one instruction cache 306, for storing data and instructions, respectively, within the cluster. The data cache 304 may be an L1 cache.

In the FIG. 3 embodiments, the cluster 202 also includes a shared cache, which may be an L2 cache. In an embodiment, the shared cache is accessible to the core processors 302 through, for example, a switching circuit 312.

In an embodiment, the shared cache is partitioned into multiple caches 308a, 308b, 308c, 308d (308a-d) and 310a, 310*b*, 310*c*, and 310*d* (310*a-d*). In an embodiment, each of the caches 308*a-d* and each of the caches 310*a-d* is implemented as a tag-and-data cache (TAD). In an embodiment, each of the caches 308 and 310 is an N-way associative cache. In the discussion to follow, these caches may be referred to individually as the cache 308 or the cache 310, or collectively as the caches 308 and the caches 310. While two groups of caches are described, with four caches in each group, embodiments according to the present invention are not so limited. That is, there may be more or less than four caches per group, and there may be more than two groups of caches.

In the FIG. 3 embodiments, memory requests can be issued by any of the core processors 302. Each memory request includes an address (e.g., a virtual address).

With reference back to FIG. 2, the clusters 202 are coupled to one or more local memory controllers 204*a*, 204*b*, 204*c*, and 204*d* (204*a-d*). The memory controllers 204*a-d* are each configured to enable access to an external (or attached) memory (the main memory). The main memory may include multiple DRAMs 206*a*, 206*b*, 206*c*, and 206*d*, with each DRAM coupled to a respective memory controller. While four memory controllers and four DRAMs are shown in FIG. 2, embodiments according to the invention are not so limited.

In embodiments, each core processor in the clusters 202 includes circuitry that implements a prefetcher. The prefetcher can be configured to prefetch cache lines from any level of the memory hierarchy or from the main memory to a lower level in the memory hierarchy including the L1 cache.

In embodiments, one or more coprocessors 208 (FIG. 2) are each coupled to the clusters 202 through a respective I/O bridge (IOB) 220. As such, a coprocessor 208 is coupled to the core processors 302 and the caches 308 and 310 (FIG. 3) through an IOB 220. A coprocessor 208 may include, for example an I/O device, a compression/decompression processor, a hardware accelerator, a Peripheral Component Interconnect Express (PCIe) bus, or the like. Each coprocessor 208 can be configured to store data in, or load data from, the caches 208 and 210 (FIG. 2) in a cluster 202. A coprocessor 208 can also be configured to send, or assign, processing tasks to the clusters 202 (specifically, to the core processors 302 in the clusters). Accordingly, in an embodiment, the system 200 includes an intra-chip interconnect interface 222 that includes buses and is configured to couple the coprocessor 208 to the clusters 202, and is also configured to couple the coprocessor and the clusters to the memory controllers 204*a-d*. The coprocessor 208 can also be configured to receive data or processing tasks from other components such as other systems (e.g., chips), which may be like the system 200. Accordingly, in an embodiment, the system 200 also includes an inter-chip interconnect interface 224 that includes buses and channels and is configured to couple the system 200 to other systems. Thus, the system 200 is configured to exchange data and processing tasks with other systems.

In the discussion to follow, terms such as "first," "second," and "third" are used only as modifiers to distinguish between elements that have the same name and do not necessarily imply an order or ranking, except as noted or apparent according to the context of their use.

In overview, in embodiments according to the present invention, multiple memory requests associated with a load instruction may be generated, accessed, or received. Each memory request includes an address (a virtual address) that is translated to a physical address where the data that is the objective of the memory request is stored. When a memory request results in a cache miss, an entry in memory is accessed. The entry includes data associated with previous memory requests that are associated with the load instruction and that resulted in a cache miss. In embodiments, the entry is one of a number of entries stored in a table. As will be described in further detail below, the data in the entry can be used to determine whether there is a pattern in the virtual addresses included in the memory requests associated with the load instruction, and also can be used to determine the pattern's stride if there is a pattern. The stride for the pattern can then be used to advantageously prefetch data for the load instruction.

For example, with reference to FIG. 4, a program counter value PC is associated with a load instruction I2. In this example, there are three memory requests: a first memory request MR-1, a second memory request MR-2, and a third memory request MR-3. In the examples discussed herein, for the load instruction I2, the second memory request MR-2 immediately precedes the third memory request MR-3, which in turn immediately precedes the first memory request MR-1. Thus, for the load instruction I2, the second memory request MR-2 and the third memory request MR-3 are the most recent memory requests relative to the memory request MR-1. There may be one or more memory requests that preceded the second memory request MR-2, and one or more memory requests that follow the first memory request MR-1.

The second memory request MR-2 includes an address A, the third memory request MR-3 includes an address B, and the first memory request MR-1 includes an address C. In embodiments, the addresses A, B, and C are virtual addresses. In the examples below, both the second memory request MR-2 and the third memory request MR-3 resulted in a cache miss.

FIG. 5A illustrates an example of a computer system memory-resident table 500 that can be used in methods for prefetching data in embodiments according to the present invention. More specifically, the table 500 can be used for detecting a pattern in virtual addresses in memory requests, and that information can be used to prefetch data. The table 500 can be stored in, for example, a memory of the computing systems 100 and 200 of FIGS. 1 and 2, respectively.

In the example of FIG. 5A, the table 500 includes a number of entries exemplified by the entry 502. Each entry in the table 500 is associated with (corresponds to) a respective load instruction. For example, the entry 502 is associated with the load instruction I2. Each of the other entries in the table 500 is associated with a different load instruction.

In embodiments, each entry in the table 500 includes two data elements (generally referred to as first data and second data) that include the virtual addresses (or parts of the virtual addresses) that were included in the two most recent memory requests that are associated with the load instruction associated with the entry and that resulted in cache misses. In the example of FIG. 5A, the entry 502 includes first data I2_D1 and second data I2_D2. With reference also to FIG. 4, the first data I2_D1 and the second data I2_D2 include the addresses (or parts of the addresses) that were included in the two most recent memory requests MR-2 and MR-3 that are associated with the load instruction I2; as noted above, in this example, these two memory requests resulted in cache misses. Thus, the first data I2_D1 includes all of, or at least a portion of, the address A, and the second data I2_D2 includes all of, or at least a portion of, the address B.

In embodiments, the first data and the second data in each entry in the table 500 include the same number of bits. In one such embodiment, the first data and the second data each includes 32 bits. In embodiments, the position of the set of bits in the portion of the virtual address included in the first data is the same as the position of the set of bits in the portion of the virtual address included in the second data. In other words, for example, the first data I2_D1 includes the 32 least significant bits of the address A, and the second data I2_D2 includes the 32 least significant bits of the address B.

In embodiments, a unique index is associated with each entry in the table 500. For example, the index Ind_2 is associated with the entry 502. In an embodiment, each index is based on the program counter value associated with the load instruction that is associated with the entry. Thus, for example, the index Ind_2 for the entry 502 is based on the program counter value PC associated with the instruction I2.

Specifically, in an embodiment, the index for an entry is determined by hashing selected bits of the program counter value for the load instruction associated with that entry. In an embodiment, the table 500 includes $2^N$ entries ($K=2^N$; N is an integer) and the hash is performed by XORing three sequences of N bits of the program counter value. For example, if the table 500 includes 512 entries ($512=2^9$; N=9), then three sequences of nine bits of the program counter value PC for the instruction I2 are hashed as follows to determine the index Ind_2 for the entry 502:

$$\text{Ind\_2}=PC[10:2] \text{ XOR } PC[19:11] \text{ XOR } PC[28:20]. \quad (\text{Eq. 1})$$

Because the program counter value is different for each load instruction, and because the number of bits that are hashed is based on the number of entries in the table, any two indexes in the table 500 are prevented from having the same value.

However, embodiments according to the present invention are not limited to the above type of hash.

Figure 6:
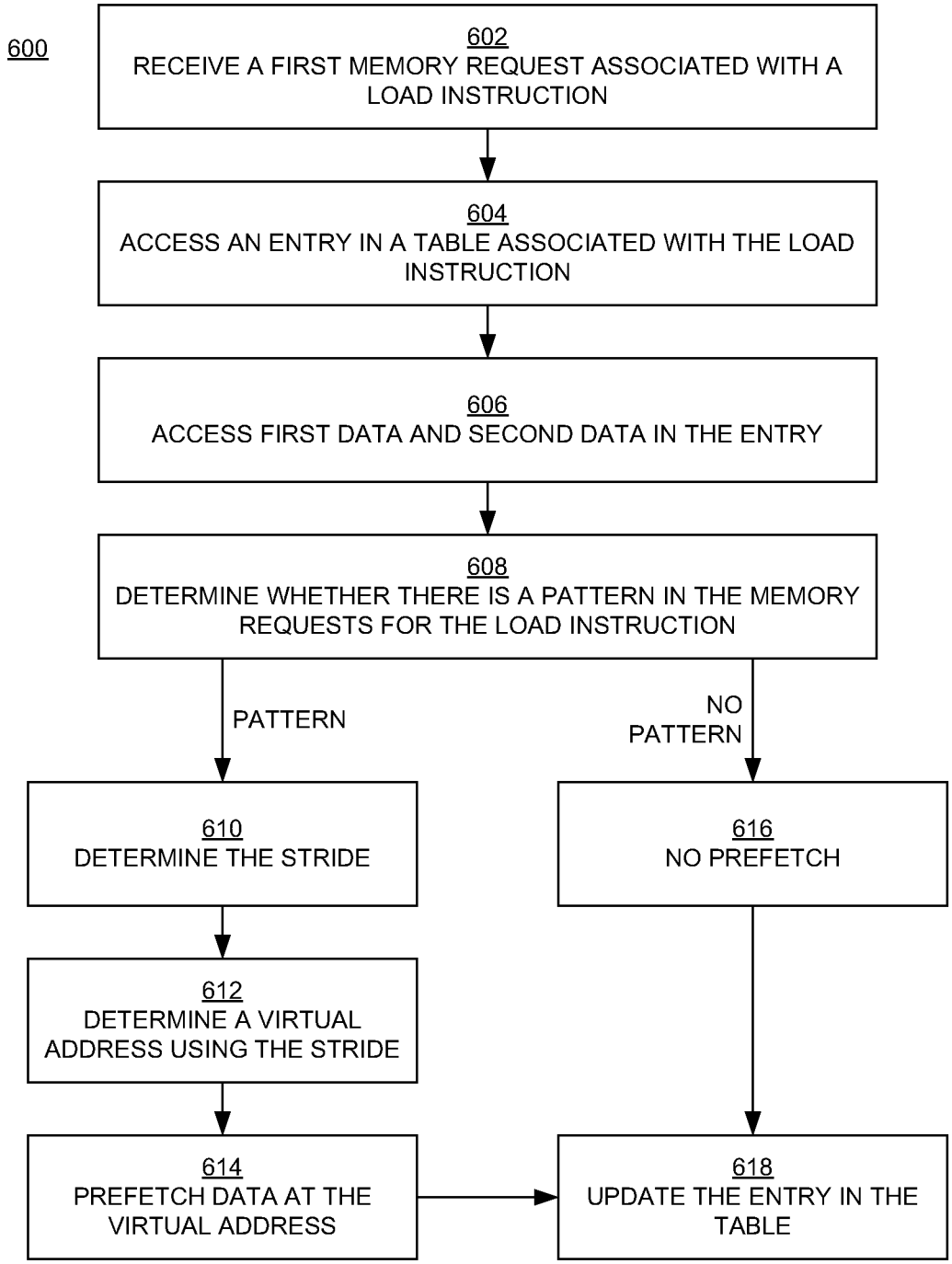
FIGS. 6 and 7 are flowcharts of examples of operations in computer-implemented methods for prefetching data in embodiments according to the present invention.

FIG. 6 is a flowchart 600 of examples of operations in computer-implemented methods for prefetching data in embodiments according to the present invention. The operations can be performed in and by the computing systems 100 and 200 of FIGS. 1 and 2, respectively. Specifically, the operations can be performed with the prefetcher circuitry in the systems 100 and 200 and mentioned above.

In block 602 of FIG. 6, with reference also to FIG. 4, the first memory request MR-1 is accessed, generated, or received. The first memory request MR-1 is associated with a particular load instruction (I2) and includes an address (address C). In embodiments, the address C is a virtual address.

In block 604, with reference also to FIG. 5A, the entry 502 is accessed. In an embodiment, the entry 502 is accessed when the first memory request MR-1 results in a cache miss. In embodiments, the entry 502 is selected using information associated with the first memory request MR-1. In an embodiment, the entry 502 is selected by hashing bits in the program counter value PC associated with the load instruction I2, using Eq. 1 as described above. The hash of that program counter value PC yields the index Ind_2, which is then used to select the entry 502 in the table 500.

In block 606, the first data I2_D1 and the second data I2_D2 in the entry 502 are accessed (e.g., read). With reference also to FIG. 4, the first data I2_D1 includes the address A or at least a portion of the address A, and the second data I2_D2 includes the address B or at least a portion of the address B. As mentioned above, in an embodiment, the address A and the address B were included in the two most recent memory requests MR-2 and MR-3 that were associated with the same load instruction I2 as the first memory request MR-1 and that also resulted in cache misses.

In block 608, with reference also to FIGS. 4 and 5A, the difference between the first data I2_D1 (the address A or portion thereof) and the second data I2_D2 (the address B or portion thereof) is compared with the differences between a corresponding portion of the address C (from the memory request MR-1) and the first data and the second data, respectively. That is, the difference between the first data I2_D1 and the second data I2_D2 is compared with the difference between the first data and a corresponding portion of the address C (I2_C), and the difference between the first data I2_D1 and the second data I2_D2 is also compared with the difference between the second data and the corresponding portion I2_C of the address C.

The corresponding portion I2_C of the address C refers to the set of bits in that address that are in the same positions as the set of bits in the address A that are included in the first data I2_D1 and the positions of the set of bits in the address B that are included in the second data I2_D2. For example, if the first data I2_D1 includes the entire address A, and the second data I2_D2 includes the entire address B, then the corresponding portion I2_C of the address C includes the entire address C. Alternatively, if the first data I2_D1 includes, for example, only the M least significant bits of the address A, and if the second data I2_D2 also includes only the M least significant bits of the address B, then the corresponding portion I2_C of the address C is the M least significant bits of the address C. In an embodiment, M is 32 bits.

For example, in response to a cache miss for the memory request MR-1 for the load instruction I2, the first data I2_D1 and the second data I2_D2 are read from the entry 502, and their difference is compared with the differences between a corresponding portion I2_C of the address C and the first data and the second data, respectively, as just described above and as represented below:

(I2_D1−I2_D2) is compared to (I2_C−I2_D1); and
(I2_D1−I2_D2) is compared to (I2_D2−I2_C).

When the result of either comparison is true, this indicates that there is a pattern in the addresses of the memory requests MR-2, MR-3, and MR-1, in which case the pattern's stride can be determined and a prefetch can be performed. Thus, if either Eq. 2 or Eq. 3 is true, then the flowchart 600 proceeds to blocks 610, 612, 614, and 618; if neither is true (both are false), then the flowchart 600 proceeds to block 616 and 618:

$$(I2\_D1-I2\_D2)==(I2\_C-I2\_D1), \text{ or} \quad (\text{Eq. 2})$$

$$(I2\_D1-I2\_D2)==(I2\_D2-I2\_C). \quad (\text{Eq. 3})$$

In block 610, the stride (S) is determined by determining the distance (difference) between the first data I2_D1 and the second data I2_D2. If Eq. 2 is true, then the stride is the second data minus the first data: S=I2_D2−I2_D1. If Eq. 3 is true, then the stride is the first data minus the second data: S=I2_D1−I2_D2. In general, the stride S is the absolute value of the difference between the first data I2_D1 and the second data I2_D2.

In block 612, a fourth address D (a fourth virtual address) is determined by adding the stride to the address C (FIG. 4).

In block 614 of FIG. 6, data at the fourth address D is prefetched into the cache where the cache miss occurred.

In block 616, when there is not a pattern in the virtual addresses of the memory requests, a new virtual address is not determined and a prefetch is not performed.

In block 618, regardless of whether or not a prefetch is performed, the corresponding portion of the address C (I2_C) is included in the table 500 as shown in the example of FIG. 5B (I2_D3=I2_C). In an embodiment, the newer address data (e.g., I2_D3) replaces the oldest data in the entry 502. In the example of FIG. 5B, the first data I2_D1 was included in the entry 502 before the second data I2_D2 was included in that entry, so in this case the first data I2_D1 is replaced with the newer data I2_D3. If, instead, the second data I2_D2 was older than the first data I2_D1, then the second data I2_D2 would be replaced. Accordingly, the entry 502 includes the addresses, or portions of the addresses, for the most recent memory requests (now the memory requests MR-3 and MR-1) associated with the load instruction I2. Note that the order of the first and second data (e.g., I2_D3 and I2_D2) in the entry does not matter, because either of the possible orders of the data is accounted for by performing two comparisons and then calculating the stride depending on which comparison is true (blocks 608 and 610 of FIG. 6).

The table 500 continues to be updated, as described, for any memory requests for the load instruction I2 that occur after the memory request MR-1. The operations in the flowchart 600 can be performed in parallel for each load instruction executing in parallel with the load instruction I2, using the entries in the table 500 respectively associated with those other load instructions.

By identifying patterns of virtual addresses in memory requests using entries in a table as described above, and then using that information to prefetch data into a cache, embodiments according to the present invention reduce cache misses. As a result, significant improvements in computer benchmarks used in the industry (e.g., "specint" and "specfp") have been measured. For example, specint improves by two percent, and specfp improves by eight percent. Embodiments according to the present invention can be used to detect to detect patterns in virtual addresses with large offsets and to prefetch data for strides of any practicable length, including offsets and strides much longer than 4096 bytes (e.g., on the order of megabytes, although the present invention is not so limited). Thus, embodiments according to the present invention can be used to predict virtual addresses across different memory pages and to prefetch data across different memory pages.

Figure 7:
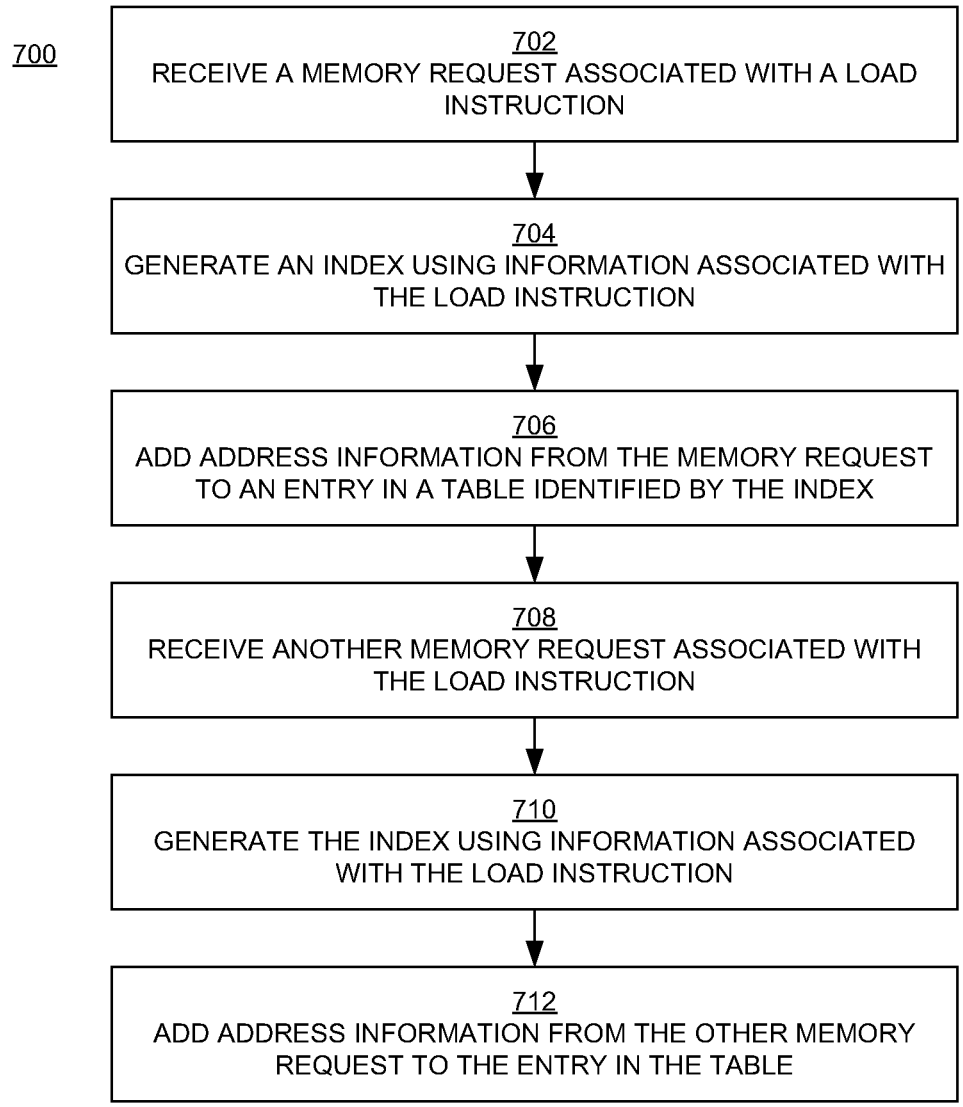

FIG. 7 is a flowchart 700 of examples of operations in computer-implemented methods for prefetching data in embodiments according to the present invention. More specifically, the flowchart 700 includes examples of operations in a computer-implemented method for generating an entry in a table like the table 500 of FIG. 5A. The operations in the flowchart 700 can be performed in and by the computing systems 100 and 200 of FIGS. 1 and 2, respectively.

In block 702 of FIG. 7, with reference also to FIG. 4, a memory request MR-2 is generated or received. The memory request MR-2 is associated with the load instruction I2 and thus is also associated with the program counter value PC for the load instruction I2 as described above.

In block 704, the index Ind_2 is generated based on the program counter value PC. In an embodiment, the index Ind_2 is generated by hashing the program counter value PC for the instruction I2 using Eq. 1 as described above.

In block 706, with reference also to FIG. 5A, the first data I2_D1 associated with the memory request MR-2 (the address A or a portion of that address) is stored in the table 500 at an entry in the table identified by the index Ind_2 (e.g., at the entry 502). If that entry does not yet exist (e.g., because the memory request MR-2 is the initial memory request for the load instruction I2), then the entry is created.

In block 708 of FIG. 7, with reference also to FIG. 4, after the memory request MR-2 is received or generated, the memory request MR-3 associated with the load instruction I2 and the program counter value PC is received or generated.

In block 710, in response to the memory request MR-3, an index is generated based on the program counter value for the load instruction associated with that memory request. Because both of the memory requests MR-2 and MR-3 are associated with the same load instruction, the result of this operation is again the index Ind_2.

In block 712, with reference also to FIG. 5A, the second data I2_D2 associated with the memory request MR-3 (the address B or a portion of that address) is stored in the table 500 at the entry in the table identified by the index Ind_2 (at the entry 502).

Other entries in the table 500 are similarly created for other load instructions executing in parallel with the load instruction I2.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The example methods described and/or illustrated herein may also omit one or more of the steps described or illustrated herein or include additional steps in addition to those disclosed.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the present invention.

Embodiments according to the invention are thus described. While the present invention has been described in particular embodiments, it should be appreciated that the invention should not be construed as limited by such embodiments, but rather construed according to the following claims.

What is claimed is:

1. A computer-implemented method of prefetching data into a cache, the computer-implemented method comprising:

accessing an entry in memory, wherein the entry is selected using information associated with a first memory request comprising a first virtual address, and wherein the entry comprises first data comprising at least a portion of a second virtual address and also comprises second data comprising at least a portion of a third virtual address;

comparing an arithmetic difference between the first data and the second data with arithmetic differences between a corresponding portion of the first virtual address and the first data and the second data respectively; and if a result of said comparing is true, determining a fourth virtual address by adding the arithmetic difference between the first data and the second data to the first virtual address and then prefetching the data at the fourth virtual address into the cache.

2. The computer-implemented method of claim 1, further comprising including at least a portion of the first virtual address in the entry.

3. The computer-implemented method of claim 2, wherein the first data was included in the entry before the second data was included in the entry, and wherein the computer-implemented method further comprises removing the first data from the entry.

4. The computer-implemented method of claim 1, wherein the information used to select the entry comprises a program counter value associated with the first memory request.

5. The computer-implemented method of claim 4, further comprising hashing bits of the program counter value to determine an index that is used to select the entry.

6. The computer-implemented method of claim 5, wherein the entry is included in a table that comprises $2^N$ entries, wherein N is an integer, and wherein further said hashing comprises XORing three sequences of N bits of the program counter value.

7. The computer-implemented method of claim 1, further comprising generating the entry prior to receiving the first memory request, wherein the first memory request is associated with a program counter value, and wherein said generating comprises:
   receiving a second memory request associated with the program counter value and comprising the second virtual address;
   generating an index for the entry based on the program counter value;
   storing the first data in a table at the entry;
   after said receiving the second memory request, receiving a third memory request associated with the program counter value and comprising the third virtual address; and
   storing the second data in the table at the entry.

8. The computer-implemented method of claim 1, wherein the first data comprises the least significant bits of the second virtual address, and wherein the second data comprises the least significant bits of the third virtual address.

9. The computer-implemented method of claim 8, wherein the entry comprises 64 bits, wherein the first data comprises 32 bits, and wherein the second data comprises 32 bits.

10. A system, comprising:
    a processor;
    a memory coupled to the processor; and
    a cache coupled to the memory;
    wherein the processor is operable for executing instructions that, when executed, perform operations in response to a first memory request comprising a first virtual address that results in a miss in the cache, the operations comprising:
       accessing an entry in a table stored in the memory, wherein the entry is selected using information associated with the first memory request, and wherein the entry comprises first data comprising at least a portion of a second virtual address and also comprises second data comprising at least a portion of a third virtual address;
       determining a difference between the first data and the second data by subtracting the second data from the first data;
       determining respective differences between a corresponding portion of the first virtual address and the first data and the second data, by subtracting the first data from the corresponding portion of the first virtual address and by subtracting the corresponding portion of the first virtual address from the second data;
       comparing the difference between the first data and the second data with the respective differences between the corresponding portion of the first virtual address and the first data and the second data; and
       if a result of said comparing is true, determining a fourth virtual address by adding the difference between the first data and the second data to the first virtual address and then prefetching the data at the fourth virtual address into the cache.

11. The system of claim 10, wherein the first data was included in the entry before the second data was included in the entry, and wherein the operations further comprise:
    including at least a portion of the first virtual address in the entry; and
    removing the first data from the entry.

12. The system of claim 10, wherein the information used to select the entry comprises a program counter value associated with the first memory request, and wherein the operations further comprise hashing bits of the program counter value to determine an index that is used to select the entry.

13. The system of claim 10, wherein the operations further comprise generating the entry prior to receiving the first memory request, wherein the first memory request is associated with a program counter value, and wherein said generating comprises:
    receiving a second memory request associated with the program counter value and comprising the second virtual address;
    generating an index for the entry based on the program counter value;
    storing the first data in the table at the entry;
    after said receiving the second memory request, receiving a third memory request associated with the program counter value and comprising the third virtual address; and
    storing the second data in the table at the entry.

14. The system of claim 10, wherein the first data comprises the least significant bits of the second virtual address, and wherein the second data comprises the least significant bits of the third virtual address.

15. A system comprising:
    means for reading a first virtual address in a first memory request;
    means for selecting an entry in memory using information associated with the first memory request, wherein the entry comprises first data comprising at least a portion of a second virtual address and also comprises second data comprising at least a portion of a third virtual address;
    means for determining an arithmetic difference between the first data and the second data;

means for determining arithmetic differences between a corresponding portion of the first virtual address and the first data and the second data respectively;

means for comparing the arithmetic difference between the first data and the second data and the arithmetic differences between the corresponding portion of the first virtual address and the first data and the second data;

means for adding the arithmetic difference between the first data and the second data to the first virtual address to determine a fourth virtual address; and means for fetching data at the fourth virtual address into a cache.

16. The system of claim 15, further comprising means for replacing the first data in the entry with at least a portion of the first virtual address, wherein the first data was included in the entry before the second data was included in the entry.

17. The system of claim 15, further comprising means for determining an index that is used to select the entry.

18. The system of claim 15, further comprising means for hashing bits of a program counter value associated with the first memory request to determine an index that is used to select the entry.

19. The system of claim 15, further comprising means for generating a table comprising the entry.

20. The system of claim 15, further comprising means for generating the entry prior to receiving the first memory request.

* * * * *